April 21, 1964 J. R. B. ELLIS 3,129,590
PARTICULATE SOLID SAMPLING DEVICE
Filed March 3, 1961 2 Sheets-Sheet 1

INVENTOR
JOHN R. B. ELLIS
BY
ATTORNEYS

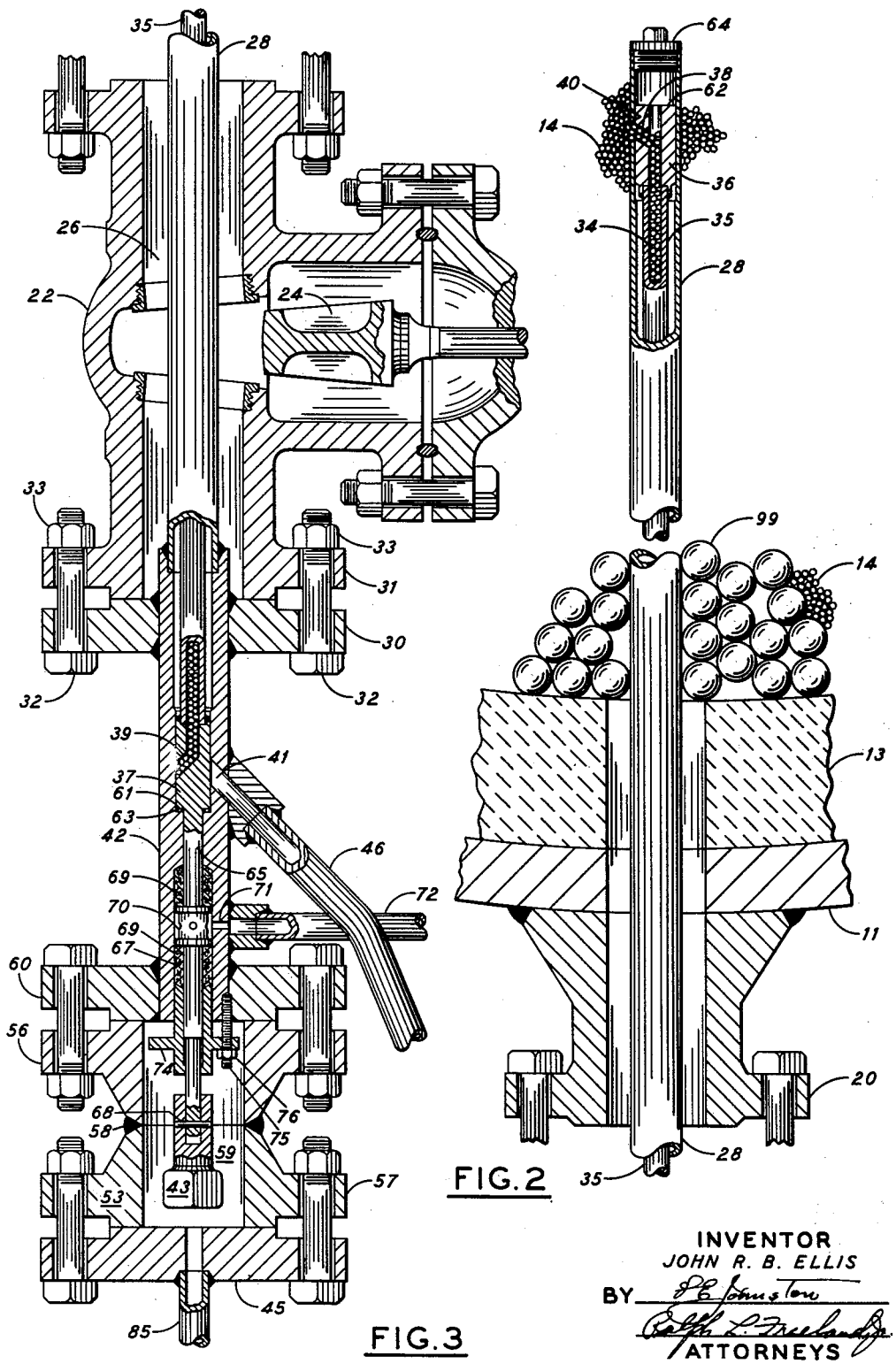

United States Patent Office 3,129,590
Patented Apr. 21, 1964

3,129,590
PARTICULATE SOLID SAMPLING DEVICE
John R. B. Ellis, Kentfield, Calif., assignor to California Research Corporation, San Francisco, Calif., a corporation of Delaware
Filed Mar. 3, 1961, Ser. No. 93,091
2 Claims. (Cl. 73—424)

The present invention relates to a catalyst sampler. More particularly it relates to a device for safely withdrawing a sample of particulate material, like catalyst, from a reaction vessel while it is operating at sub or super atmospheric conditions and without altering such conditions.

The invention has for an object the provision of a catalyst sampling device which includes an elongated tube extending through the wall of a pressure vessel wherein hydrocarbon or similar conversion is taking place in the presence of a catalyst. A movable chamber is formed in the tube for selectively isolating a portion of the tube so that it will communicate only with the interior or the exterior of the vessel. Means are provided for selectively moving the sample chamber relative to the tube means so that in one position catalyst particles will be admitted to the sample chamber at non-atmospheric conditions prevailing in the vessel. At a second position the sample is removed from the chamber. The volume sampled is small so that operating conditions of the vessel are substantially unchanged.

The catalyst sampling device is preferably and particularly adapted to fixed-bed systems and dominantly those operating at elevated temperatures, e.g. hydrodesulfurizers, hydroformers, hydrocrackers, isomerizers, and the like. Since the system is closed, and normally operates with or without cyclic regeneration for many hundreds of hours before the system is shut down, the only method known heretofore for determining catalyst activity has been rate of product decline. So long as product decline is not too fast, so that it is more economical to continue running the plant than to shut it down and replenish the catalyst, it is common to empirically change the operating conditions of the vessel. Sometimes there changes in operation are quite drastic. Hence, by the time the system is shut down, so that the catalyst can be visually checked, or chemically tested, it is grossly altered. Where the catalyst cannot be tested, changes made in operating conditions of the system frequently are likely to decrease product yield. Hence, such changes can hasten, rather than lengthen, the time when the unit must be shut down.

Even in systems, such as fixed-bed catalyst systems, where reaction and regeneration zones are carried out in the same catalyst beds at different times, it is often desired to know conditions of catalyst particles while still being subjected to reaction conditions. If catalyst samples are obtainable from that point in the system, without modification of either the catalyst or the reacting fluids, the activity of the particles can be measured under laboratory controlled conditions rather than at those prevailing during or after regeneration.

For the foregoing reasons, it has been long desired to have means for withdrawing catalyst samples from a reaction vessel during the time when hydrocarbons are reacting with the catalyst and for doing so without interference with continuity of the operation. To this end, the present invention provides an apparatus for successfully withdrawing such catalyst particles without alteration thereof during operation of the conversion vessel and without substantially changing operating conditions in the vessel.

In a preferred form of apparatus for carrying out the invention, a probe member is formed with an isolatable catalyst receiving chamber therein which can be inserted into and supported within the vessel. Desirably, the probe is located near the lower end of the vessel or sufficiently below the top of the vessel so that catalyst will flow into the catalyst receiving chamber by gravity alone. The isolating chamber may be formed by an elongated, hollow tube within another elongated tube. In one form of apparatus, these tubes have been successfully inserted upwardly through a flanged valve opening in the lower part of the reaction vessel. Sealing means are provided between the catalyst receiving chamber and the outer elongated tube so that when port means are brought into registry adjacent the inner, or upper, end of the tube, the receiving chamber is both isolated from atmospheric conditions and brought to the super atmospheric conditions prevailing in the vessel. After the sample chamber has been filled with catalyst by gravity alone, the chamber is then moved within the elongated tube, preferably by rotation, to bring a second set of ports into registry. In this second position, the interior of the sampling chamber is isolated from the vessel and opened for removal of the catalyst sample. In either the first or second positions, of course, the catalyst receiving chamber is isolated so that there is no direct communication between the interior and exterior of the vessel through the probe. As a further precaution, to avoid leakage of hydrocarbon vapors or fluid at super atmospheric conditions to the atmosphere, means are provided for testing the sealing arrangement for said sampler probe prior to the time access is had to the means for moving the isolated receiving chamber between its first and second position. Also, in accordance with the invention, an auxiliary collection chamber, isolatable from atmospheric conditions is interconnected with the receiving chamber when it is in its second, or catalyst discharging, position. Such auxiliary chamber is also connected with a vapor testing and purging means so that in case of leakage of reaction vessel fluids into the catalyst sampling chamber, its sealing means can be tested and cleared prior to opening it to atmospheric conditions.

Further objects and advantages of the present invention will become apparent from the following detailed description taken in conjunction with the accompanying drawings which form an integral part of the specification.

In the drawings:

FIG. 2 is an enlarged section of the upper portion of the catalyst sampler of FIG. 1 showing particularly the part of the probe unit that enters the catalyst reaction vessel, and shows in a vertical view, partially in section, the construction of the catalyst chamber in the probe.

FIG. 3 is an enlarged view of the lower end of the catalyst testing device shown in FIG. 1 that particularly illustrates construction of the lower end of the probe unit shown in FIG. 2. (When combined, FIG. 3 is a lower extension of the arrangement shown in FIG. 2.)

Figure 1:
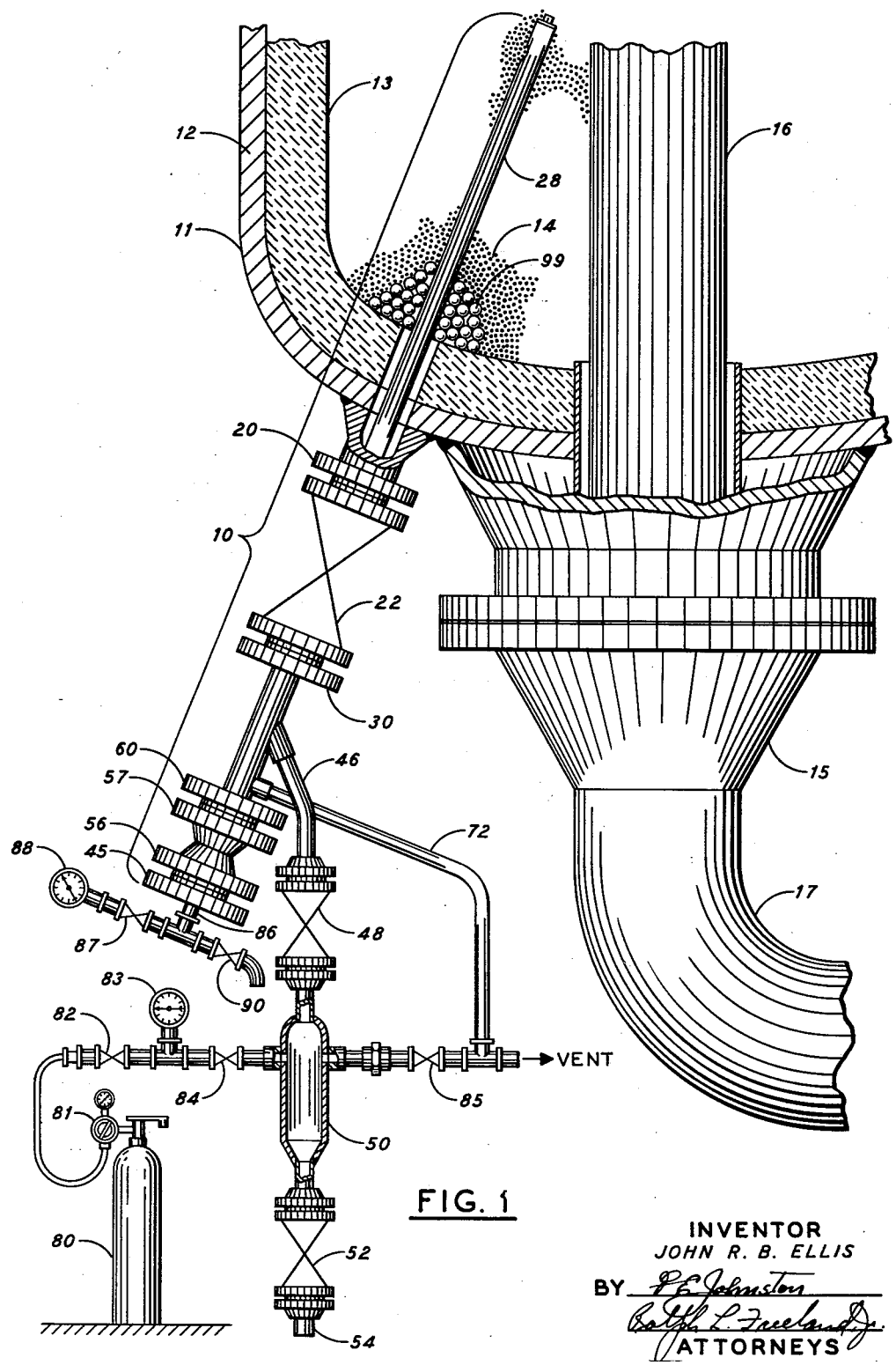
FIG. 1 is a schematic representation of a catalyst sampling device constructed in accordance with the present invention as applied to the lower end of a catalyst reaction chamber, or vessel; the latter is shown partially in section to illustrate the co-operating relationship.

Referring now to the drawing and particularly to FIG. 1, there is illustrated application of a catalyst sampling device 10, to withdraw particulate material, such as catalyst beads 14, from a vessel 11 operating at super or sub atmospheric conditions. As is conventional with such pressure vessels, it includes an outer shell 12 of pressure-resistant design and an internal insulating layer 13 so that hydrocarbons are reacted in the presence of catalyst particles at elevated pressures and/or temperatures. As further indicated schematically in FIG. 1, vessel 11 may include a bottom outflow line 15 and an internal riser 16, of which only the lower portion is shown. Neither inlet and withdrawal means for catalyst, nor the fluid feed and product lines for vessel 11 are shown in detail by the present drawings, since they are not pertinent to this invention. Further, all of these, except catalyst withdrawal, occur at higher levels.

During the processing of hydrocarbons, such as petroleum, in converting vessel 11, it is known that catalyst sometimes becomes contaminated by such trace materials as nitrogen, oxygen, sulfur, or the like, or the pressure and temperature conditions in the vessel may change so that the catalyst becomes less active. In fixed-bed systems, heretofore, it has been impossible to withdraw samples of the catalyst, particularly as it exists in the lower part of the reaction vessel, without alteration of the catalyst before it can be examined. To this end, catalyst sampler device 10, in FIG. 1, is shown inserted through an available opening, such as flange 20. Flanged opening 20 communicates with the lower interior part of vessel 11 and normally serves as an access opening to vessell 11 to unload catalyst or permit inspection of the vessel. A gate valve, of conventional design and indicated generally as 22, closes the opening in flange 20. The details of gate valve 22 are best seen in FIG. 3 where movable gate element 24 is shown in its retracted position so that passageway 26, formed in the body of gate valve 22 is unobstructed. In this position, valve 22 and flange 20 admit and support the upper end of an outer elongated tube member 28 at a point adjacent the middle of the vessel 11. In this position, catalyst can enter chamber 34 under the force of gravity alone. As indicated in both FIG. 1 and FIG. 3, tube 28 is supported in vessel 11 by flange member 30 that is bolted to end flange 31 of gate valve 22, as by bolts 32 and nuts 33.

In the present embodiment, elongated tube 28 forms a body member for the sampler probe to form a sealed chamber and along with a movable, or rotatively, supported coaxial tube 35 forms an isolatable catalyst sample chamber 34. Tube 35 includes a head section 36 and a foot section 37 that serve as journals in bearings formed by the inner walls of tube 28. Side-opening port means, designated generally as 38 and 39, formed respectively in 36 and 37, co-operate with side ports 40 and 41 in the upper and lower sections, respectively, of elongated tube 28. As indicated, side-opening ports 38 and 39, formed in the respective head journal 36 and foot journal 37, are radially aligned so that they are directed generally toward the same side within tube 28. In this way, catalyst chamber 34 is isolated so that it does not form a through passageway for the catalyst or high-pressure fluids. Thus, the catalyst sample is not forceably ejected by a difference in pressure across chamber 34. Accordingly, upon rotation of tube 35 and its lower extension 65, by turning nut 43 (after access is gained thereto by removing flanged plate 45) the ports of catalyst chamber 34 are selectively movable from a first position to a second position. In the first position, as indicated in the drawing, chamber 34 is open to the interior of vessel 11 so that particles 14 enter under gravity alone when ports 38 and 40 are in register. In the second position, tube 35 is rotated through 180 degrees, as described above, and port 39 in lower journal 37 comes into register with side port 41. Thus, in the first position, catalyst sample chamber 34 is open directly to super atmospheric conditions in vessel 11, but in the second position, chamber 34 is isolated from said vessel and is reduced to conditions suitable for removal of the catalyst therefrom.

The construction of ports 38 and 40 at the upper end of sampler 10 is important if bridging of solid particles is to be avoided during sampling. In particular, port 40 is elliptical in shape and somewhat larger than its corresponding elliptical opening or port 38 in head journal 36. Additionally, the sides of port 40 in tube 28 are beveled outwardly to increase its area in the direction of the main catalyst body.

In the present embodiment, port 41 communicates with pipe 46, which could, if desired, although not preferably, open directly to the atmosphere. However, to prevent alteration of the catalyst during withdrawal and for safety reasons, it is desirable to isolate drop-out line 46. A suitable arrangement for so doing is illustrated in FIG. 1. As there shown, tube 46 communicates through valve 48 with a drop-out pot 50, which in turn can be isolated by valve 52 from atmospheric conditions. In this way, pot 50 may be successively opened to communicate with drop-out line 46 and/or placed in communication with a collecting line 54 through valve 52. This auxiliary collector chamber, formed by drop-out pot 50, can thus be isolated from the atmosphere, and it is interconnectible with catalyst receiving chamber 34 only when the latter is in its second, or discharging, position. In this way, pressures in pot 50 and chamber 34 can be equalized by just cracking valve 48 prior to removal of the sample to pot 50 under the force of gravity alone.

As indicated hereinbefore, it is desirable that the entire catalyst sampling operation be performed in as safe a manner as possible. For this purpose the operating mechanism for moving the catalyst chamber between its first or receiving, position and its second, or discharging, position is also desirably isolated from atmospheric conditions. Such a system is shown in FIG. 3 where a housing 53, formed by a pair of flange members 56 and 57, joined together by a weld 58, is bolted to end flange 60. Flange 60 is made integral with the lower end of pipe section 42. It will be noted that the lower end of journal 37 has a shoulder 61 that bears against thrust washer 63. Additionally, shoulder 61, together with the machined fit between journal 37 and lower bearing formed by the wall of 42, prevents gross gas leakage through the space between these elements.

To further assure against leakage around the lower end of journal bearing 37, drive shaft extension 65, formed integral with sample receiving tube 35, includes a stuffing box, or packing arrangement, designated generally as 67. As seen in FIG. 3, stuffing box 67 lies between drive nut 43, which is coupled to shaft 65 by pin 68, and journal bearing 37.

In the particular embodiment shown, stuffing box 67 includes means for testing whether fluid, or gas pressure, has leaked around the lower end of journal 37 and shaft 65. For this purpose, packing 69 has been divided into upper and lower sections. A spool 70 is located between these upper and lower sections and opposite test port 71. As indicated in FIG. 1, port 71 in turn may be connected to pipe 72 which may be connected to a vent line. For the purpose of tightening packing 69 above and below spool 70, packing gland 74 surrounds the lower end of shaft 65. Suitable means for tightening packing gland 74 against packing 69 is provided by stud 75 and the nut 76 whose operation is apparent from FIG. 3. As indicated, gland 74 slides along the length of the shaft 65 when nut 76 is screwed down on stud 75.

To prevent leakage of catalyst fines between top journal bearing 36 and wall of tube 28, it will be noted that the upper end of tube 28 is closed by threaded cap 64. However, it is not the purpose of this cap to isolate chamber 34 from pressures in vessel 11, since it is desirable that the pressures be equalized before transfer of catalyst, so that such material enters only under the influence of gravity.

As discussed hereinbefore, it is desirable in the operation of a hydrocarbon conversion system that the entire operation of sampling catalyst be done as safely as possible. In the present embodiment, best seen in FIG. 1, nitrogen, or other inert gas, is supplied to various components of the system so that any combustible fluids trapped by operation of the sampler 10 can be displaced by an inert gas. For this purpose, a tank of nitrogen is indicated schematically as 80. It includes the usual regulator and pressure indicating devices 81 and a suitable distribution valve 82 and pressure gauge 83. Various arrangements can be used for controlling nitrogen flow to any desired location. The present system includes valves 84 and 85, placed on opposite sides of sample drop-out pot, or auxiliary receiving chamber 50. By this arrangement, drop-out pot 50 can be flushed, or filled, with nitrogen, before either of the main drop-out valves 48 or 52 are operated, or any attempt is made to withdraw catalyst samples from outflow line 54. The system also may be vented through valve 85.

In operation of this safety system, means are also provided to check whether fluid leakage has occurred into valve operating compartment 59 of housing 53, wherein operating nut 43 is located. For this purpose, as also shown in FIG. 1, pressure sensing line 86 communicates with a passage through end face plate 45 and permits the pressure therein to be checked by gauge 88 when valve 87 is opened. If no corrective measures are needed, as indicated by gauge 88, reading zero pressure in compartment 59, end plate 45 may be removed for access to the catalyst sampling chamber operating means. Gaseous pressure built up in chamber 59, including that due to leakage of inert gas, can be relieved by opening valve 90.

Since some gas under pressure will be trapped in catalyst receiving chamber 34, when in its sampling position it is desirable to be able to flush drop-out pot 50 before catalyst is taken therefrom. For this purpose, it is desirable to fill chamber 50 with an inert gas, such as nitrogen, carbon dioxide, or the like, before a sample is taken, and back-flush the chamber before catalyst is removed through valve 52 and line 54. Also, by this arrangement the sample can be cooled without exposing it to the air.

Desirably, drop-out pot 50 has sufficient volume to hold a much larger sample of catalyst than can be trapped in chamber 34. In this way, clogging of valve 48 by particles can be avoided.

In the initial installation of the catalyst probe unit into vessel 11, it is desirable that catalyst be kept away from the immediate vicinity around the opening into flange 20. For this purpose, a group of ball bearings 99, or other large inert objects, are packed around the lower end of tube 82, as best seen in FIG. 2. Such objects permit easier entry and withdrawal of the probe unit and prevent packing of catalyst particles around the opening to flange 20.

While, in the present embodiment, probe 10 is shown at an angle to true vertical, it is desirable to make the entry into chamber 11 as near vertical as possible. Hence, if the vessel is built specifically to accept probe 10, it is advantageous to align flange 20 with the vertical plane of vessel 11. In this way, different lengths of samplers can be used to reach any desired elevation in vessel 11.

From the foregoing description, it will be readily seen that tube 35, forming sample receiving chamber 34, could be reciprocated rather than rotated in sleeve 28 to bring ports 38 and 40 and ports 39 and 41 into registry. However, it is important that such ports be brought into registry only when chamber 34 is isolated from either vessel 11 or drop-out line 46.

If desired, tubes 28 and 35 can be lengthened and increased in diameter so that several isolating chambers, such as 34, can be formed with ports that open at different elevations in vessel 11 to admit catalyst samples.

Various other modifications and changes in the structure and operation will also be apparent to those skilled in the art from the foregoing specification. All such modifications and changes falling within the scope of the appended claims are intended to be included therein.

I claim:
1. Apparatus for withdrawing a limited sample from a bed of particulate material at a central location in a vessel operating under nonatmospheric conditions without substantial disturbance of the particulate solids therein, which comprises a solid elongated tube extending through a wall of said vessel into a central portion of said vessel, said tube having an entry port formed at the end remote from the wall of said vessel, an elongated tubular member substantially coextensive in length with, and rotatably mounted within, said elongated tube, said tubular member having a first port adapted to register with said entry port in said tube to fill said tubular member with a sample from a central portion of a bed of particulate material at the nonatmospheric conditions in said vessel, said tubular member having a second port formed adjacent the opposite end of said member and exterior to said vessel, and exit port means formed in said tube exterior of said vessel adapted to register with said second port in said tubular member to permit removal of said sample, said exit and said second ports being adapted to be brought into register only when said entry and said first ports are out of register, and means exterior to said vessel to rotate said tubular member between the two conditions of register of said ports, whereby the whole of said sample removed from the vessel is representative of the particulate material in the center of said bed and without substantial change in the operating conditions of said vessel.

2. Apparatus insertable through a valved opening in the lower part of a reaction vessel to remove a sample of catalyst beads from a known location adjacent the center of said reaction vessel, which comprises an elongated probe adapted to extend from a point exteriorly of the valved opening in a reaction vessel into a central location in said vessel and away from the walls thereof, said probe having a restricted diameter to prevent substantial disturbance of the catalyst and fluid flow in said vessel adjacent said known sampling point, said probe including an elongated solid pipe having its end closed and a side opening port adjacent said closed end to permit entry of catalyst beads by gravity flow from said known location into the interior thereof, an elongated chamber member rotatably mounted within said pipe, said chamber member having a pair of openings adjacent its opposite ends, one of said openings being registrable with said side opening port of said probe and the other of said openings being registrable with a port in said probe member exterior to said vessel, said openings to said chamber member being at the same side so that the interior of said sample chamber may be selectively connected to collect a sample and to discharge it without direct communication between the interior of said vessel and the exterior of said vessel, and the length of said chamber member being substantially coextensive with the length of said pipe and limited in diameter to permit all of a small sample of said catalyst beads to be taken directly at said known sampling point, and means for rotating said sample chamber between said sample filling and sample discharge positions.

References Cited in the file of this patent
UNITED STATES PATENTS

| | | |
|---|---|---|
| 1,966,712 | Fisher et al. | July 17, 1934 |
| 2,516,097 | Woodham et al. | July 18, 1950 |
| 2,811,041 | Beatty | Oct. 29, 1957 |
| 2,973,645 | Grimes et al. | Mar. 7, 1961 |